United States Patent
Dang et al.

(10) Patent No.: US 7,710,059 B2
(45) Date of Patent: May 4, 2010

(54) METHOD OF OPTIMIZING SERVO CONTROLLER POWER IN TWO-DIMENSIONAL FLEXURE MEMS STORAGE DEVICE

(75) Inventors: Hien P. Dang, Nanuet, NY (US); Sri M. Sri-Jayantha, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/211,840

(22) Filed: Sep. 17, 2008

(65) Prior Publication Data

US 2009/0015187 A1    Jan. 15, 2009

Related U.S. Application Data

(63) Continuation of application No. 11/345,883, filed on Feb. 2, 2006, now Pat. No. 7,427,846.

(51) Int. Cl.
    *G05B 11/01* (2006.01)

(52) U.S. Cl. .................. 318/560; 318/649; 318/650
(58) Field of Classification Search ............... 318/560, 318/649, 650, 652, 567, 565, 575, 638
See application file for complete search history.

(56) References Cited

U.S. PATENT DOCUMENTS

| 2004/0014440 A1 | 1/2004 | Makela et al. |
| 2004/0204776 A1 | 10/2004 | Sri-Jayantha et al. |
| 2005/0084153 A1 | 4/2005 | Khomo |
| 2008/0284365 A1* | 11/2008 | Sri-Jayantha et al. ........ 318/638 |

* cited by examiner

*Primary Examiner*—Karen Masih
(74) *Attorney, Agent, or Firm*—Scully, Scott, Murphy & Presser, P.C.; Vazken Alexanian

(57) ABSTRACT

A method of optimizing a servo controller power required in the operation of two-dimensional flexure (Microelectronic Memory Storage) MEMS devices. Furthermore, provided is an arrangement for optimizing servo controller power in a two-dimensional flexure MEMS storage device through a utilization of the inventive method.

11 Claims, 6 Drawing Sheets

FIG. 1
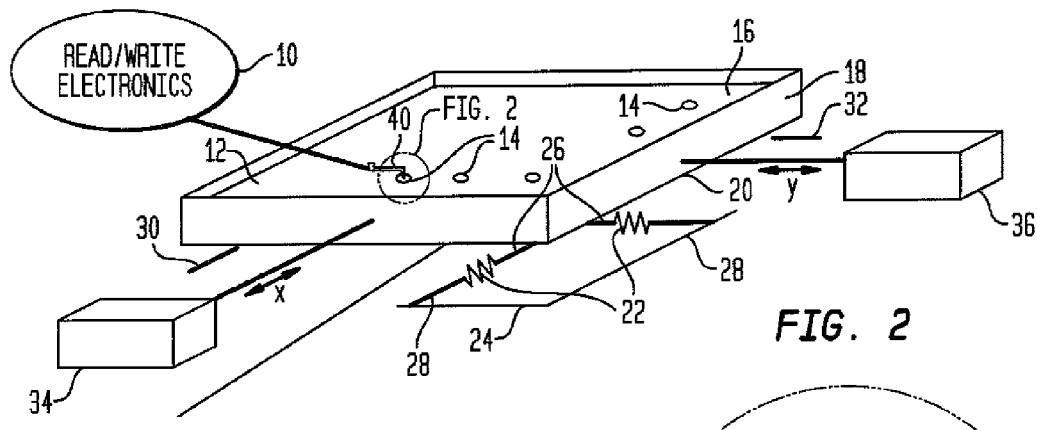
FIG. 2
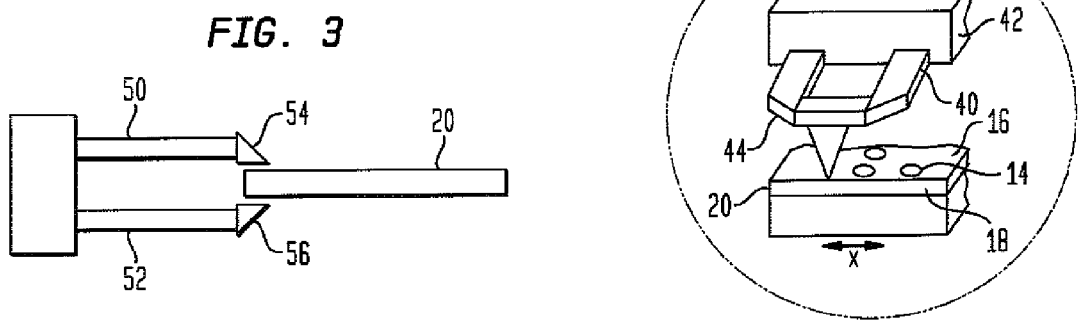
FIG. 3
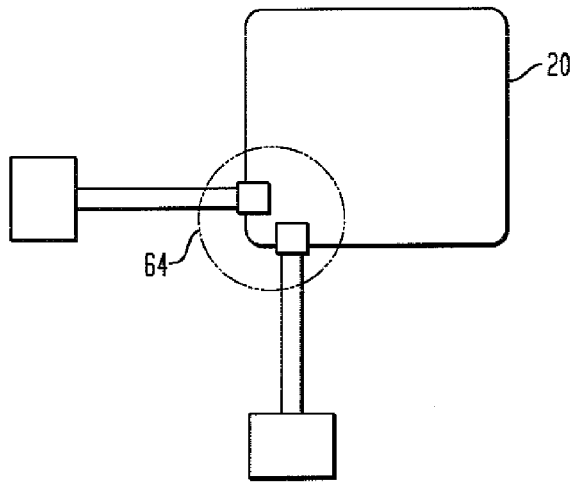
FIG. 4
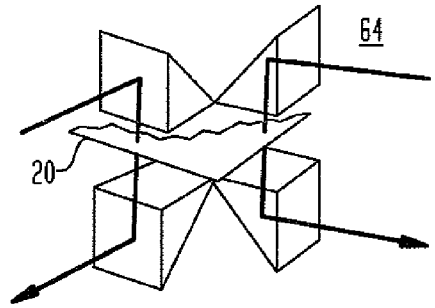
FIG. 5

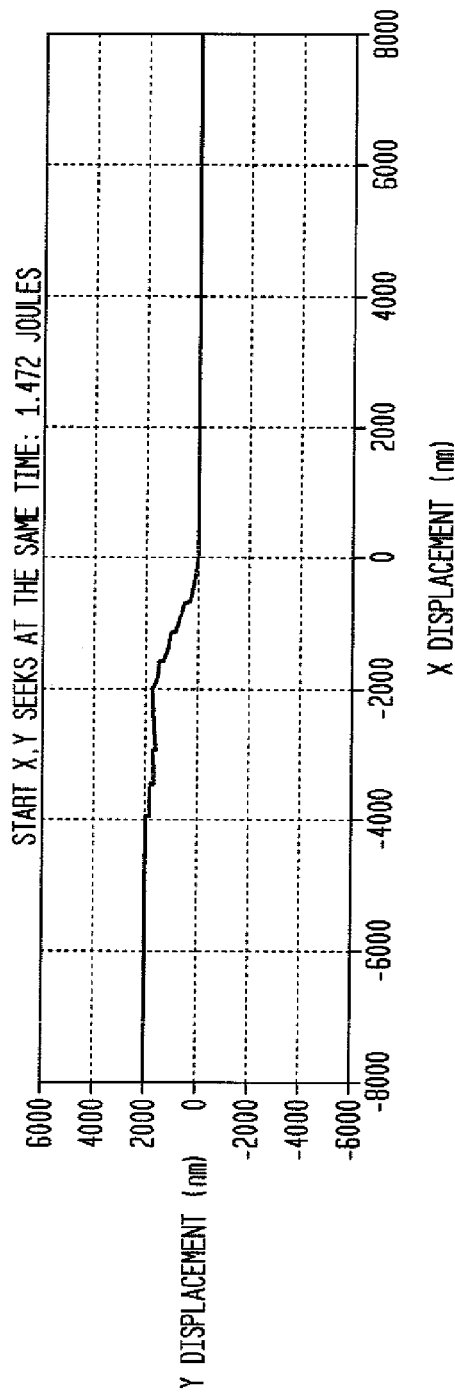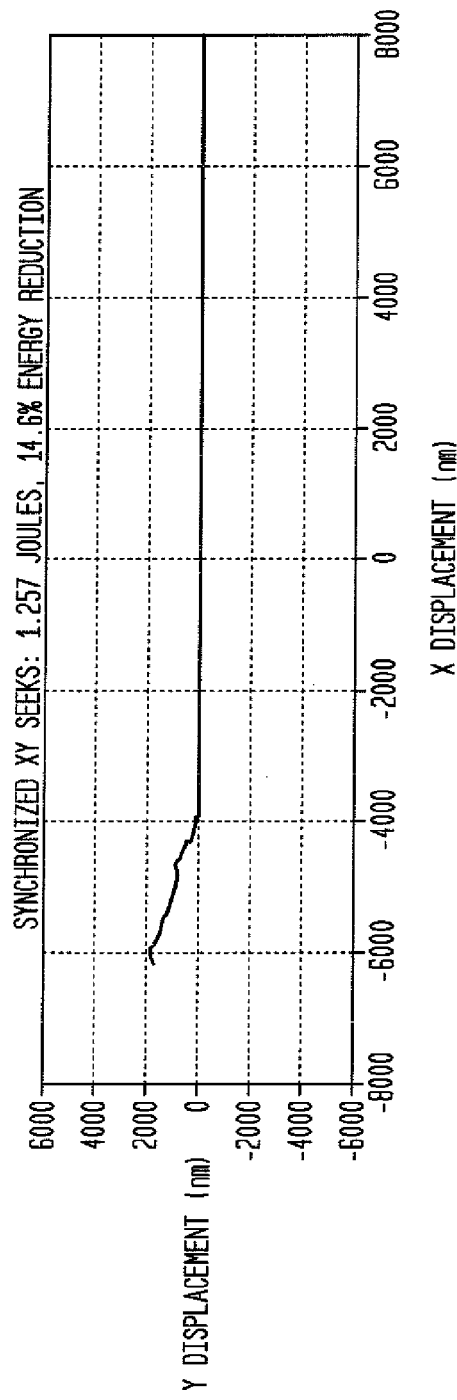

METHOD OF OPTIMIZING SERVO CONTROLLER POWER IN TWO-DIMENSIONAL FLEXURE MEMS STORAGE DEVICE

This application is a continuation application of U.S. Ser. No. 11/345,883; filed on Feb. 2, 2006, now pending.

BACKGROUND OF THE INVENTION

Field of the Invention

The present invention relates to a method of optimizing a servo controller power required in the operation of two-dimensional flexure (Microelectronic Memory Storage) MEMS devices. Furthermore, the invention is directed to an arrangement for optimizing servo controller power in a two-dimensional flexure MEMS storage device through a utilization of the inventive method.

The technology of employing microelectronic memory storage devices (MEMS) is widely employed in the manufacture and commercial and technical applications of essentially low-cost, high-density memory storage devices. In essence, pursuant to an example of the technology, which is currently in further stages of advanced development, resides in the employment of flexure-based MEMS devices (F-MEMS), which possesses a potential of enabling a memory storage of information of 1 terabits/square inch areal density. In effect, information is stored in the MEMS device through the heating up of a small cantilever probe and then producing rows of 40 nm indentations or pits on a polymethylmethacrylate (PMMA) layer of a thickness of 50 nm. Moreover, the very same cantilever probe can be readily employed for the reading back of the information by a method of sensing the presence or, alternatively, the absence of the pits or indentations, which have been formed. Hereby, the polymethylmethacrylate (PMMA) substrate or layer is arranged so as to be mounted on a scanner platform, the latter of which, in turn, is supported by a number of flexures or flexural supports. Basically, two actuators are employed to move a scanner comprising a reading/writing sensor about the surface of the PMMA layer for retrieving the information thereon or for writing information, into the right position along, respectively, the X and Y directions.

SUMMARY OF THE INVENTION

Pursuant to the present invention, various methods can be employed for the purpose of minimizing the energy or power which is required to be furnished for powering the servo control for a flexure-based MEMS storage device (F-MEMS), which possesses two degrees (2°) of freedom, in effect, in the X and Y directions. Generally, in a normal manner, data is commonly organized in rows and columns, and then the data, such as, the indentations or pits that are formed on the PMMA layer, are accessed through a movement of a scanner comprising a reading and writing sensor from an initial idle home position in displacements along the appropriate X and Y scanning directions. Thus, while the reading and writing sensor is located in a static or idle at home position, the flexural supports or flexures, on which the scanner platform is supported, are at rest and no energy or power is consumed in order to maintain the sensor at that particular at-home location. However, in order to deflect the flexures and move the reading and writing sensor to other locations on the surface of the PMMA layer away from the at home position in, respectively, X and/or Y scanning directions, power must be supplied to the flexural supports in order to deflect the latter to facilitate movements of the sensor. This power requirement rises proportionally to the square of the distance in which the flexural supports or flexures are deflected. Although various designs may be employed in order to minimize the amount of power, which is required for the servo, which activates the displacement of the flexural supports, this requires different concepts in the utilization thereof. For example, data can be organized in various zones on the PMMA layer, whereby data, which is employed in a more frequent manner, is located closer about the at-home position of the reading and writing sensor. This enables such frequently employed data to be accessed more rapidly and at an expenditure of a much lower energy level or power requirement. For instance, in order to carry out random scanning movements seeking data on the PMMA layer, by the reading and writing sensor, the required lengthier movement is initially implemented, and the movement along the other shorter access length is delayed an appropriate amount of time, whereby both scanning movements seeking the data are completed at generally the same instant in time. This, in essence, will provide a considerable reduction in expended energy, for example, by the synchronized timing of two-micron movements, and a considerably greater amount of energy or power may be saved for even lengthier movements of the sensor.

Accordingly, it is an object of the present invention to provide a novel method of optimizing servo control power expenditures in a two-dimensional flexure MEMS storage device.

Another object of the present invention is to provide a method of the type described wherein a read/write sensor is movable about the surface of an X-Y scanner platform, which utilizes flexural supports for the scanner platform in order to be able to move the sensor in the desired X-Y-directions at a minimal expenditure of servo control power.

Another object of the present invention resides in the provision of an arrangement for the optimizing of expenditures in servo control power in two-dimensional flexure MEMS storage devices.

BRIEF DESCRIPTION OF THE DRAWINGS

Reference may now be made to the following detailed description of the preferred embodiment of the invention, taken in conjunction with the accompanying drawings; in which:

FIG. 1 illustrates, generally diagrammatically, components of a flexure-based MEMS storage device equipped with an X-Y scanner for a read/write sensor;

FIG. 2 illustrates an enlarged scanner probe detail from the encircled portion A in FIG. 1;

FIGS. 3 and 4 illustrate, respectively, side and top plan views in a diagrammatic representation of an optical position sensor employed in a test configuration on an X-Y scanner platform pursuant to the invention;

FIG. 5 illustrates, generally diagrammatically, an enlarged view of a detail in the encircled portion B of FIG. 4;

FIGS. 11a and 11b illustrate, respectively graphical representation of the energy savings of synchronized scanning seeks implemented by the F-MEMS apparatus.

DETAILED DESCRIPTION OF THE INVENTION

Figure 7:
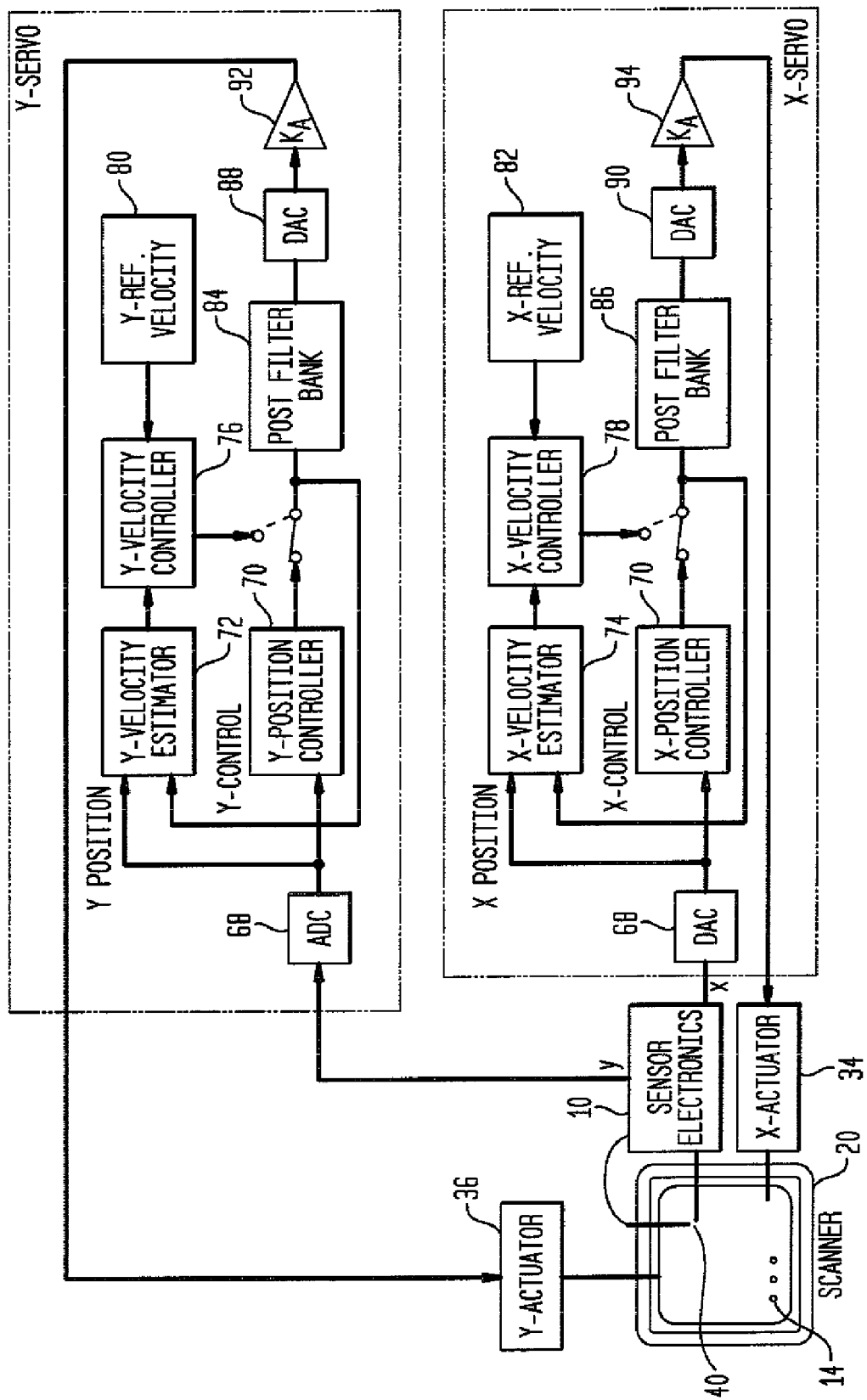
FIG. 7 illustrates a schematic illustration of a servo control system for implementing the X-Y motion of the scanner pursuant to the invention.

Referring now in detail to the invention and particularly FIGS. 1 and 2 of the drawings, there is generally diagrammatically illustrated a cantilever probe arrangement 10 for reading back information in regard to an MEMS storage device 12 through the sensing of either the presence or absence of indentations or pits 14, which are formed in the upper surface 16 of a substrate which is constituted of a thick polymethylmethacrylate (PMMA) layer 18. The PMMA substrate layer 18 is mounted in a lay flat mode on a scanner platform 20, the latter of which is supported by a number of flexural members or flexures 22. In this instance, the flexural members 22 are illustrated as being constituted of simple spring elements arranged on a stationary base 24, and have each one end 26 attached to the platform 20 and opposite ends 28 attached to stationary base 24, whereby the scanner platform is able to be subjected to a displacement in both the X and Y directions of the latter. Connected to the scanner platform 20 is an X position sensor 30 and a Y position sensor 32, which measure the displacement of the scanner platform, and wherein the displacement is imparted to the scanner platform 20 by means of an X actuator 34 and a Y actuator 36.

Contacting the upper surface 18 of the substrate which is comprised of the PMMA layer 18, is a scanning sensor 40 utilizing read and write electronics and which is adapted to, respectively, sense the presence or absence of the indentations or pits 14 representative of data which have been formed in the surface 18 of the PMMA layer 20, such indentations or pits not being illustrated in FIG. 1 for purposes of clarity. The data storage media for the MEMS device is arranged in the X-Y scanning plane, extending along the upper surface 18 of the PMMA layer 20.

As illustrated in the detail of FIG. 2 of the drawing, representing the enlarged encircled segment A from FIG. 1, there is illustrated a probe 42 from scanning sensor 40, showing a resistive heater 44, and the data-providing indentations or pits 14 which are formed in the upper surface 18 of the polymer layer 20; i.e., the PMMA layer located on the scanner platform 20. The probe 42 is adapted to contact or sense the indentations 14, and in this instance showing the movement thereof along the X-directions of the layer 20.

As illustrated in FIGS. 3 and 4 of the drawings, the position of scanners 50, 52 relative to a respective read and write (R/W) probe or sensor 54, 56 movable along the edges 58, 60 of scanner platform 20 is a necessary function in order to achieve reliable data storage functions and information. Consequently, in order to accurately sense the position to enable servo controlling, according to FIGS. 3 and 4, X and Y optical sensors are employed, as shown in FIG. 5, above and below the scanner platform, whereby a light beam is transmitted through an optical fiber in order to direct a light against the movable edge of the MEMS. The light beam passing through the optical fiber is then reflected through an angle of approximately 90° utilizing a miniature prism structure 64, the latter of which, for example, may be 1 millimeter in size.

Furthermore, the light beam, which passes over a movable edge, is then captured by a second prism, deflected a further 90° and transmitted back to the scanner platform or portion of the sensor electronics. Consequently, the amount of light which is received in proportion to the light which is transmitted forms the basis of a voltage output of the edge sensor 54, 56, and the voltage is then linearly correlated with the location of the platform edge.

Figure 6:
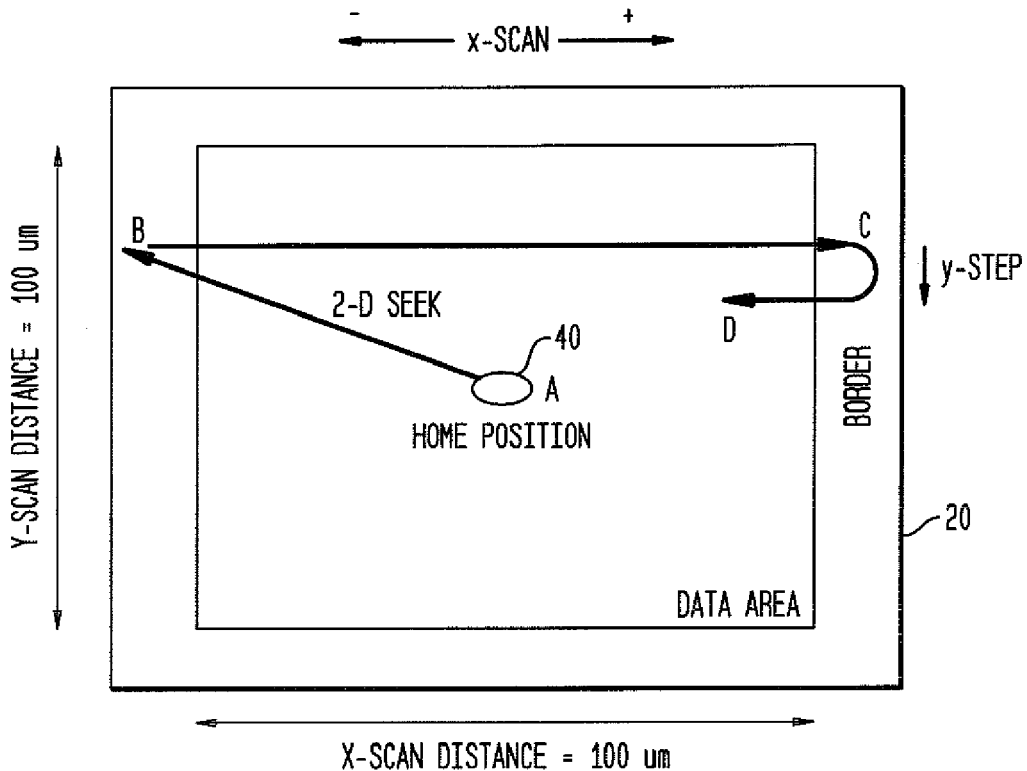
FIG. 6 illustrates, diagrammatically, data seek and scan trajectories for the X-Y scanner of the present invention.

Basically, as represented, the read/write operations of the sensor require two widely different position control capabilities, as illustrated in FIG. 6 of the drawings, in a diagrammatic plan representation. In that instance, a two-dimensional random seek and track follow scan is employed wherein scanning sensor 40 with no control force of light thereto, in effect, in a relax mode, is initially is addressed in the home position, located in FIG. 6 and designated by point "A". In order to implement an active operation in the movement of the sensor or read and write electronic component, which necessitates a movement thereof away from the home position, and when access to a data block (i.e., indentations 14), which is present on the PMMA layer 20 is required, the scanning sensor 40 must be moved from location "A" to a further location at point "B" on the surface 18 along two dimensions, in effect, along an X trajectory and a Y trajectory. Nominally, the X seek or movement in the X direction is identical for all data blocks, whereas the Y scan or seek is effected in a random manner. Once the location "B" is within reach, the scanning sensor 40 must change the velocity factor thereof in order to move along a path in order to move towards a location at point "C", and read or write data along the path of movement. For lengthy data records, the scanning sensor must be able to reach the end of a path of travel along a +X access, then reverse direction and execute a reverse movement scan along the (–X) access towards a location at point "D".

The scanner developed for this application has the freedom to move independently or selectively along X and Y Cartesian coordinates. Thus, two distinct position sensors and two feedback servo loops controlling two electromagnetic actuators 34, 36, schematically shown in FIG. 1, are employed to implement the disclosed invention. It is noted that in FIG. 1, the freedom to move along X-Y coordinates is in reality provided by a complex system of flexures (details not shown), but schematically represented by a single "spring" element 22 for each degree of freedom of motion.

A proportional-integral-derivative (PID) servo controller is used in this MEMS storage device. The characteristic PID controller transfer function, for example in analog form, is represented by the following expression:

$$\text{Controller(Output/Input)} = (K_P + K_D S + K_I/S) \quad [1]$$

where gains $K_P$, $K_D$ and $K_I$ are proportional, derivative and integral gains, and "S" is the Laplace transform operator. The parameterization process to compute the gains is well known in the technology. A control system designer would thus use a dynamic model of the scanner, and would derive the gain values in order to achieve an "optimum" design.

The servo system is required to perform three critical tasks. First, it must move the scanner along the X and Y coordinates to the vicinity of a target track (Location B in FIG. 6) within a minimum time using a velocity servo in a seek mode. To facilitate a robust and reliable seek to a target track, a desired velocity profile is typically stored in a memory and a velocity servo (in contrast to a position servo) is employed to reach the vicinity of a target path. Next, the control system must position the scanning sensor 40 on the track center line (TCL) of a target path using the Y-direction servo with minimum settleout time using a position controller of the type shown in Equation (1), with $K_1$ normally set to 0. Finally, the Y-servo system enters the track-follow mode with the Y-servo having a proportional-integral-derivative type (PID) position controller and the X-servo entering a scan mode desiring a fixed, predetermined scan velocity (by either using a position servo or a velocity servo). This operation is referred to as a track-follow-scan mode to emphasize the fact that the Y-servo is maintaining the storage media along a TCL as the X-servo persistently maintains a predetermined scan velocity. Both servos need to maintain precision against disturbances, such as unknown hysteresis effects and vibration.

The complete servo architecture to achieve this operation, as well as the X-Y seek, is shown in FIG. 7. It is to be noted that for completely decoupled dynamics of a scanning sensor along the X and Y coordinates, the servo system can be selected to have identical building blocks, but different controllers (positions verses velocity) may be switched in and out of the servo loop at various phases of the scanner motion. The position information is generated by the previously mentioned optical edge sensors 54, 56 and converted to a stream of digital numbers (at 5 kHz in this example) by an analog-to-digital converter (ADC) 68. A digital controller for each axis consists of a position controller block 70; velocity estimator blocks 72, 74; velocity controller blocks 76, 78; reference trajectory blocks 80, 82; and post filter banks 84, 86. Under the supervision of a microprocessor (not shown), the functions provided by the blocks are activated appropriately. The computed control output in digital form is sent to a digital-to-analog converter (DAC) 88, 90 at a rate equal to or different from, the input sampling rate. The analog signal generated by the DAC drives a current amplifier 92, 94, which in turn energizes the actuator 34, 36 of the scanner 40.

Figure 8:
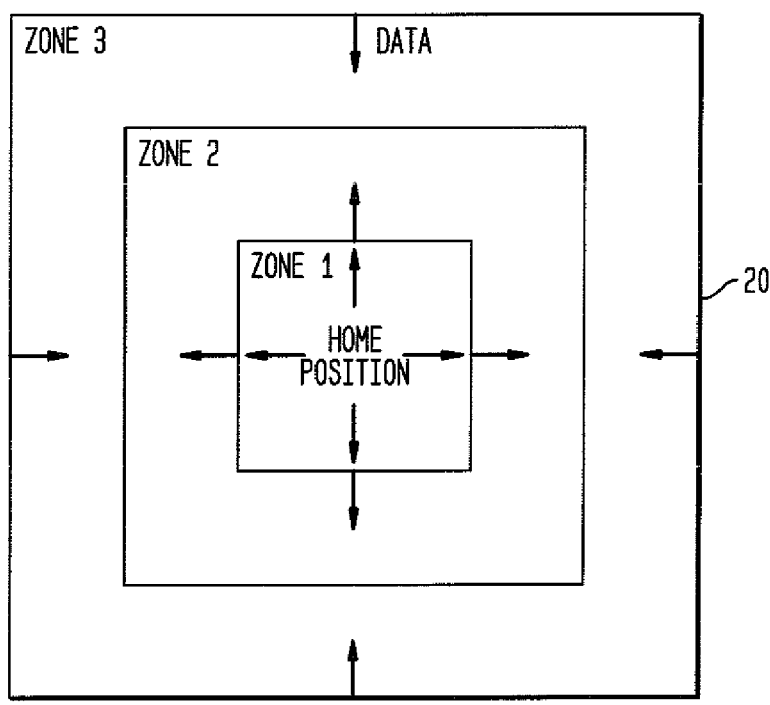
FIG. 8 illustrates, diagrammatically, zonal data storage capabilities, illustrated diagrammatically pursuant to the invention.

In compact flash memory, it takes the same amount of energy to sequentially read/write a block of data, independently of its location and data is stored in the next available slot from the last write. This is not the case with a flexure-based MEMS storage device. It takes the same amount of energy to read or write a bit but it takes additional energy to overcome the force of the flexure to access data further out from the home position. This, in turn, has a big impact on how data is stored in power sensitive applications. Herein, it is proposed that data are stored in zones, depending on the data type and the operating mode of the device (FIG. 8). Zone 1 clusters around the home position for the scanning sensor 40, and it is reserved for frequently used data or data that need to be retrieved in the shortest amount of time. Zone 2 is for incoming new data, whereas the oldest data reside in Zone 3. Data migrate from the inner zone to the outer zone when the hosted device, i.e., notebook computer, is recharging and the F-MEMS 12 is idle. In Zones 1 and 2, data grows outwardly from the home position (indicated by the arrows). In Zone 3, data grows inwardly toward the home position, and the oldest data are saved at the furthest spot from the home position. The boundaries between zones can be shifted depending on a user's application.

Figure 9A:
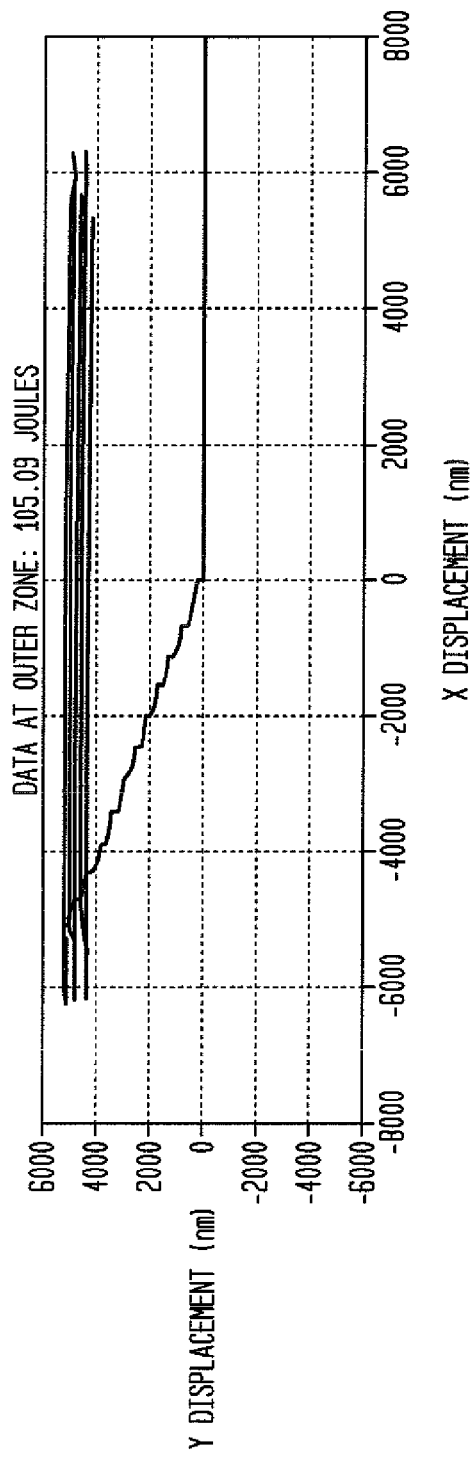
FIGS. 9a and 9b illustrate respectively energy saving charts in the storage of the data in a main region proximate the at-home position of the read/write sensor.
Figure 9B:
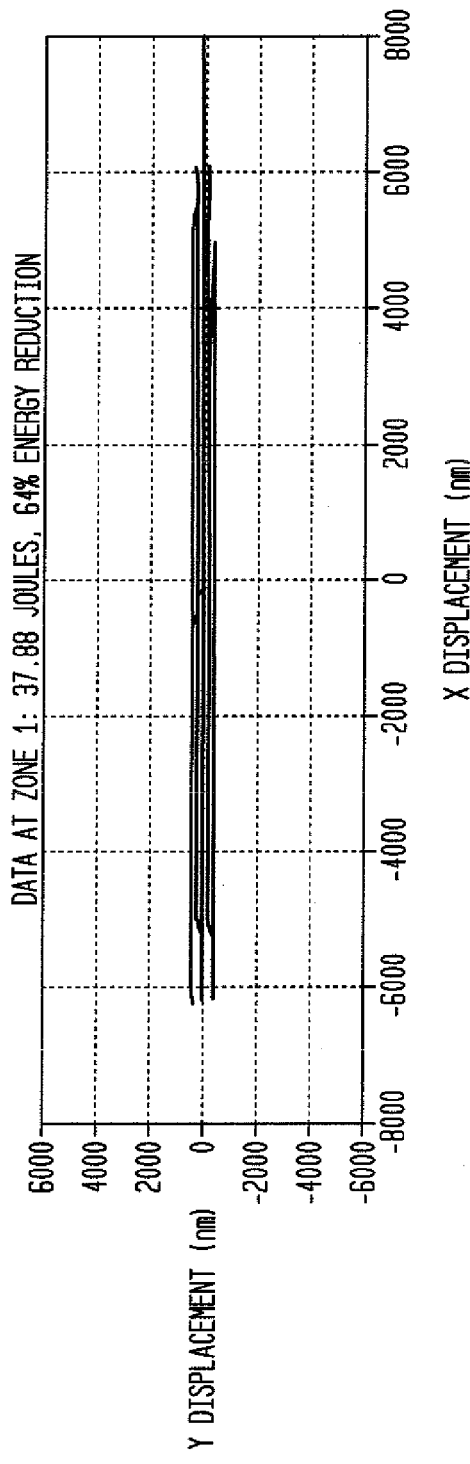

FIGS. 9A and 9B illustrate the difference in accessing two identical blocks of data in two different zones. Each block of sequential data is spread over 5 horizontal scan lines of 10 micron in length. It takes 105.09 Joules to access the data block in Zone 2 or 3, located at 5 microns from the home position (FIG. 6a) and 37.88 Joules for accessing an identical data block clustered around the home position (Zone 1). This is an energy saving of 64%. This number becomes even higher if it is compared to a data block that is located further out from the home position, such as 100 microns away.

Figure 10A:
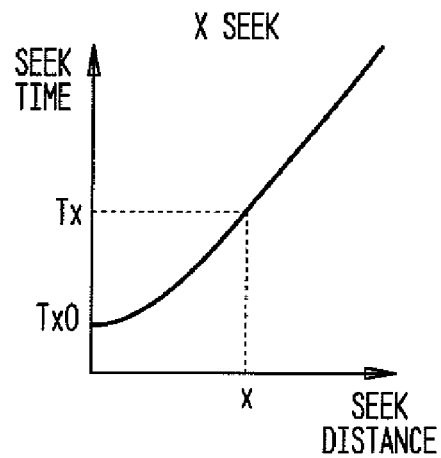
FIGS. 10a, 10b and 10c illustrate respectively plotted time versus distance functions of the X and Y scanner for the displacement of the sensor and the retrieving and/or writing of data.
Figure 10B:
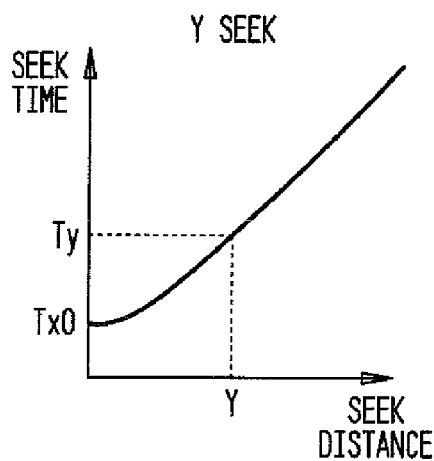
Figure 10C:
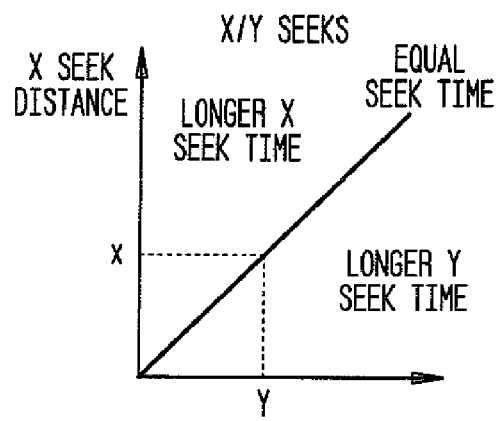

With an F-MEMS, energy can be further conserved by applying some intelligence to random seeks. First, needed to know are the seek times Tx, Ty as a function of distances X, Y, respectively. Tx and Ty can be experimentally measured or estimated from the equations below:

$$Tx=Tx0+(X-X0)/\text{Velocity-}X$$

$$Ty=Ty0+(Y-Y0)/\text{Velocity-}Y$$

Wherein Tx0 is the time required to move the minimum distance X0, including acceleration to Velocity-X and slow down to 0. Velocity-X is the seek velocity for the X-axis. Similarly, Ty0 is the time needed to move Y0 distance and Velocity-Y is the seek velocity for the Y-axis. Tx and Ty are plotted in FIGS. 10A and 10B, respectively, wherein FIG. 10C shows the locus of X-Y seek timers. If Tx equals Ty, then this type of seeks is represented by the diagonal line. The space above this line is for cases that have longer Tx. Longer Ty cases are below the diagonal line.

Once Tx and Ty are known, then it becomes possible to synchronize the issue of the X-Y seek commands such that both commands are completed at the same time. For example, if Tx and Ty are the same, then both seeks are issued at the same time. If Tx is N milliseconds longer than TY, then X seek command is executed first, then Y seek will be delayed by N milliseconds.

FIG. 11A shows experimental data of a random seek case where X moves by 6 micron, Y moves by 2 microns and both seek commands are issued at the same time. Y has a shorter distance to move so it arrives much earlier than X and power is needed to fight the flexure stiffness to keep the Y at 2 microns. Needed are 1.472 Joules for this two-dimensional seek and scan across one line of data. In FIG. 11B, X-Y seeks are synchronized so that both arrive at the same time and no Y power is wasted waiting for X to arrive. Here, the same two-dimensional seek and one line scan consume only 1.257 Joules, an energy saving of 14.6%. This saving will be more when X-distance is much larger than Y-distance.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

What is claimed is:

1. An arrangement for optimizing servo controlled power in the operation of two-dimensional flexure microelectronic memory storage devices, comprising:

a stationary base member;

a movable scanner platform having memory storage media located on an upper surface of said scanner platform;

flexural supports for said scanner platform being positioned on said stationary base member facilitating displacement of said movable scanner platform in x- and y-directions relative to said stationary base member;

actuators connected to said movable scanner platform and being responsive to the operation of servo controllers for imparting said x- and y-directional displacements thereto, including x- and y-position sensors for determining the extent of displacement of said scanning platform; and a scanning structure movable along x- and y- coordinates about the surface of said scanner platform containing said microelectronic memory storage media to the vicinity of a target track within a period of time minimizing power output required for said servo controllers.

2. An arrangement as claimed in claim 1, wherein said servo controllers reduce power requirements for said actuators by a zonal data storage array on said movable scanner platform.

3. An arrangement as claimed in claim 2, wherein said zonal data storage array on said scanner platform comprises clustering of frequently employed data about a home position of said scanning structure.

4. An arrangement as claimed in claim 3, wherein said servo controllers actuate said actuators for x- and y- displacements so as to synchronize random seeks in the microelectronic memory storage devices so as to necessitate minimum power requirements for random data seeks on said scanner platform surface.

5. An arrangement as claimed in claim 3, wherein said data is arranged on said scanner platform so as to propagate outwardly in predetermined zones and inwardly towards said home position in further zones.

6. An arrangement as claimed in claim 1, wherein said scanning structure comprises an electronic read and write device displaceable about the data-containing surface of said movable scanner platform.

7. An arrangement as claimed in claim 1, wherein said scanning structure comprises a scanner probe positioned at the peripheral edge of said movable scanner platform.

8. An arrangement as claimed in claim 7, wherein said scanning structure comprises prisms forming said scanner probe on opposite sides of the scanner platform edge.

9. An arrangement as claimed in claim 1, wherein each said x- and y-servo controller comprises, respectively, operative system velocity estimators, velocity controllers and position controllers in operative interconnections with said x- and y-actuators and sensor electronics determinative of the displacement of said scanning structure on the surface of said scanner platform.

10. An arrangement as claimed in claim 1, wherein said data is provided on the surface of said scanner platform as an array of surface indentations or pits.

11. An arrangement as claimed in claim 10, wherein said indentations or pits are formed in a polymer layer located on the upper surface of said scanner platform; and said scanning structure includes a resistive heater probe for contacting said indentations and pits to derive data therefrom.

* * * * *